Sept. 14, 1926.
W. E. JONES
VEHICLE BUMPER
Filed Jan. 28, 1926
1,599,770
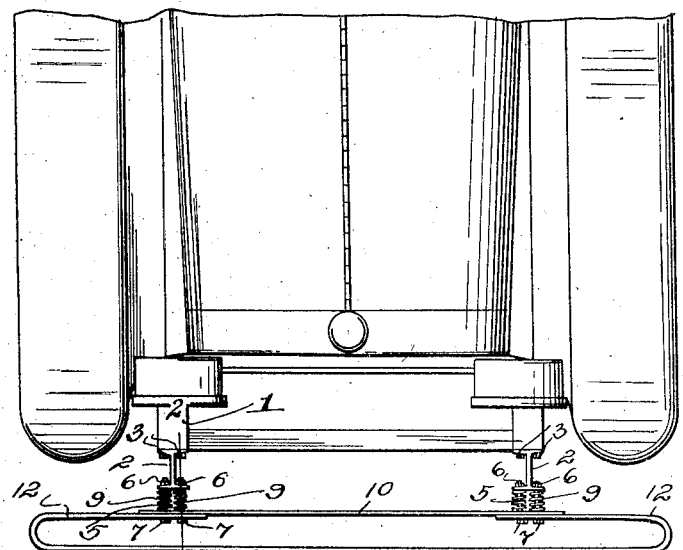
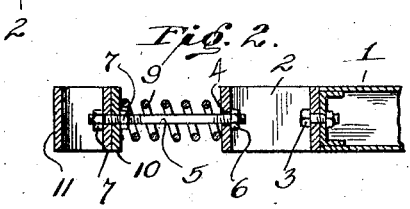
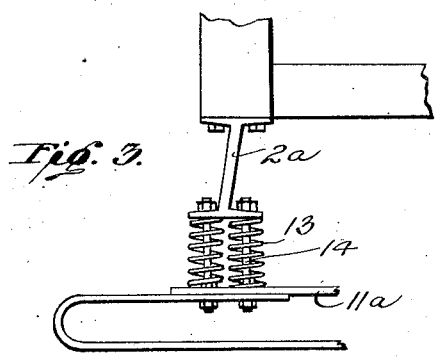
Inventor
William E. Jones
By W. S. McDowell.
Attorney Patented Sept. 14, 1926.

1,599,770

UNITED STATES PATENT OFFICE.

WILLIAM E. JONES, OF COLUMBUS, OHIO.

VEHICLE BUMPER.

Application filed January 28, 1926. Serial No. 84,468.

This invention relates to improvements in vehicle bumpers, and has for its principal object the provision of a durable and strongly constructed bumper which, when mounted in connection with a motor vehicle will absorb the shocks and jars and minimize or prevent injury to the vehicle in the event of collisions and accidents.

Another object of the invention is to provide a simple and inexpensive bumper which can be readily assembled and attached to the frame of an automobile and wherein the impact receiving portion of the bumper is capable of moving longitudinally of the vehicle, against spring resistance, when a movable or stationary object is engaged, the purpose of the construction being to provide for relief of the impact or blow receiving portion of the bumper, to allow the latter to yield under the pressure and to prevent injury and damage not only to the vehicle but to the bumper construction itself.

With these and other objects in view, as will appear as the description proceeds, the invention consists in the novel features of construction, combinations of elements and arrangements of parts hereinafter to be fully described and pointed out in the appended claims.

In the accompanying drawing:

Figure 1 is a top plan view of the bumper comprising the present invention,

Figure 2 is a vertical longitudinal sectional view taken on the line 2—2 of Figure 1, Figure 3 is a plan view showing a slightly modified form of the invention.

Referring more particularly to the drawings the numeral 1 designates the frame of a motor vehicle. To the corners of this frame there are connected a pair of anchoring members 2, which in this instance are in the form of eye beam sections, through the base flanges of which pass fastening elements 3 which are used in bolting the anchoring members to the frame.

The head or outer flanges of the anchoring members are apertured as at 4 for the reception of a pair of bolts 5 for each of said anchoring members. These bolts are provided with threaded ends for the reception of nuts 6 which engage normally the headed flanges of the anchoring members, as shown in Figure 2.

The outer ends of the bolts 5 are also threaded for the reception of nuts 7, between which is clamped and secured the primary impact receiving structure of the bumper. This structure is rigidly secured to the bolts 5 by means of the clamping nuts 7, and coil springs 9 of the expansion type are interposed between the anchoring members 2 and said impact receiving structure so that the latter will be resiliently spaced from said anchoring members, the expansion of the springs 9 being limited by the engagement of the nut 6 with the headed flanges of the anchoring member 2. The primary impact receiving structure comprises in this instance a transversely extending bar 10 of spring steel arranged longitudinally in advance of the vehicle, and this bar has its outer ends apertured for the reception of the bolts 5. Cooperative with the bar 10 is a bowed spring steel bar 11, which has its outer ends inturned as at 12 and apertured for the reception of the bolts 5.

By this construction it will be seen that when the bumper encounters a movable or stationary obstacle the impact is cushioned first by the coil springs 9, which allow the entire length of the structure 8 to recede with increasing resistance under the force of the blow. Then, as the springs 9 near their limit of compression the forwardly disposed structure 8, particularly the bar 11, is permitted to respond to the pressure exerted, and being of strong and stiffer construction, finally absorbs the full concussion so that the stopping of the vehicle is effected in such manner as to avoid injury first, to the vehicle itself and secondly, to the bumper structure. In the past, it has been customary to mount the spring bars 10 and 11 rigidly in connection with the vehicle frame so that such bars are relied upon to absorb the impact. Due to the stiffness of said bars and their rigid mounting a very considerable shock is imparted to the vehicle and often times the bumper itself is bent and distorted so as to be unfit for further use. In the present construction this is obviated by the provision of the spring mounting for the outer impact receiving structure.

As shown in Figure 3 supplemental springs 13 may be employed, which surround bolts 14 extending from the diagonally arranged anchoring members 2$^a$ to the outer ends of the bar 11$^a$. As it frequently occurs that it is this bar only of the bumper that is engaged by an obstacle or other object, in order to strengthen this portion of the bar and provide relief therefor the diagonally arranged springs are employed.

What is claimed is:

1. A bumper comprising a pair of fixed anchoring members carried by an automobile frame, a primary shock absorbing bar arranged at the front of said members and including resilient bowed extremities, bolts passing through said extremities and through openings in said anchoring members, coil springs surrounding said bolts and interposed between the extremities of said bar and said anchoring members, and means for limiting the expansive action of said springs.

2. An automobile bumper comprising a pair of fixed anchoring members carried by the frame of a motor vehicle, a bowed shock absorbing bar arranged in front of said anchoring members and including resilient inturned extremities, a straight bar uniting said extremities and located laterally with respect to said bowed bar, bolts carried by said bars and slidably received by said anchoring members, and coil springs interposed between said bars and said anchoring members.

In testimony whereof I affix my signature.

WILLIAM E. JONES.